:::
United States Patent Office 3,034,781
Patented May 15, 1962

3,034,781
WORK GUIDANCE MECHANISMS
William S. Touchman and Loyd A. Barnes, Cedarville, Ohio, assignors to United Shoe Machinery Corporation, Boston, Mass., a corporation of New Jersey
Filed May 5, 1960, Ser. No. 27,214
36 Claims. (Cl. 271—1)

This invention relates to mechanism for feeding and guiding generally flat work pieces of irregular shape, and is more especially concerned with providing improved means for automatically steering flexible work pieces with respect to a tool for operating thereon. Although the invention is herein illustrated as embodied in a machine adapted to skive upper leather, it is to be noted that the invention is not thus limited, but has application to a wide variety of machines and these may incorporate intermittently and/or continuously operative types of instrumentalities for acting on the work being fed in any one of numerous ways. Accordingly, it will be understood that practice of this invention is not restricted as to the material being processed, which may for instance be paper, fabric, leather, plastic or other composition, nor as to the nature of the particular machine function which may, by way of example, be sewing, edge shaping, treating or folding, eyeleting, marking, perforating or the like.

Manual feeding and guiding of work pieces in a machine with respect to an operating tool becomes onerous when the pieces are flexible and/or nonuniform in character and especially if the operating path of the tool is to be irregular or of compound curvature. The matter of providing safe, rapid and reliable mechanical guidance for sheet material as it is fed in a machine under such conditions has been dealt with hitherto, it sufficing for present purposes to mention the techniques disclosed in United States Letters Patent 2,259,502, issued October 21, 1941 in the names of Laurence E. Topham and Stephen E. Woodbury, and in a copending application Serial No. 827,970, (now U.S. Patent No. 2,979,745) filed July 17, 1959 in the names of Hans F. Schaefer, Jr. and Robert K. Jenner, Jr. These two approaches to the problem of automatic control of the steering of sheet material are similar in some respects. Briefly, both employ a pair of work feeding wheels together with edge sensing means in the form of a photoelectric control circuit. There similarity ceases, however, since the earlier developed feed mechanism includes a pair of continuously driven work-engaging wheels, the inner one (i.e. the one normally closer to the edge of the work) being reversibly operated at a variable speed, and the outer one being nonreversibly operated at a lower speed also variable. In contrast thereto the Schaefer et al. approach embodies a pair of work-engaging wheels both of which are intermittently operative, the inner one being driven at a variable, reversible speed while the outer one is driven at reversible speed in fixed ratio to that of the inner wheel. Experience has shown the latter arrangement to be an effective and valuable organization but one which, at times, may entail practical performance limitations relating to operating speed or sensitivity.

In view of the foregoing, and for the purpose of expediting production as well as relieving operators of tedious machine attendance, it is a principal object of this invention to provide further improved automatic work guidance means in a more versatile form of construction and capable of yielding more accurate control of the work as well as higher output speeds. Another and more specific object of the invention is to incorporate in an edge shaping machine (for instance one for skiving or folding the margins of uppers of shoes), mechanism for continuously steering a flexible work piece to present its margin progressively to a shaping tool in predetermined manner, and means for automatically ejecting the work from the machine after a selected portion of the margin has thus been presented. To these ends, a feature of this invention resides in the combination with a machine having a power driven tool adapted to operate on said material, of mechanism for steering the material with respect to the tool, this mechanism comprising an inner and an outer wheel engageable with the material, the inner wheel being rotatable at a substantially constant speed to feed the margin toward the tool, and the outer wheel being independently driven at variable, reversible speed to steer the material as it is fed, said outer wheel being solely under the control of a sensing means responsive to a specified, variable curvature such as that of the margin of an irregular work piece in a locality ahead of the tool.

Within the scope of this invention several alternative arrangements of novel mechanism for the guidance of sheet material are herein described in combination with operating mechanism such as skiving means, it being recognized that space limitations plus greater stiffness or variable hardness in work pieces (notably leather) and other operating conditions impose work steering problems better handled by some combinations and slightly modified arrangements of parts than others. These alternative constructions are merely indicative of those advantageously employed in skiving material such as leather, these or other arrangements contemplated as coming within the range of this invention perhaps being preferable for work guidance when other materials and/or types of operating tools are employed. In one illustrative embodiment herein the inner or feed wheel is preferably toothed and of relatively small diameter to enable its point of engagement with the flexible work to come closely adjacent to the operating zone of a circular knife arranged to act on the margin to be skived. The outer or servo-controlled steering wheel is herein shown in each embodiment in the form of an independently driven disk arranged to rotate in a general plane angularly related to the plane of rotation of the inner wheel. It will be recognized as lying within the scope of this invention to dispose the planes of operation of the feed and steering control members angularly or in parallel relation, and that their points of engagement with the work may lie on the same side of a work piece or at opposite sides thereof, it being recognized that the size and type of operating tools to which, or past which, the work is to be fed will often dictate both size, number and relative arrangement of the particular steering and cooperating work supporting members employed. Preferably a work supporting roll is included, it usually being cooperative with the inner feed wheel when the latter is employed and, as herein shown, having an idler roll coaxially disposed for cooperating with the steering disk. Accordingly, an operator introduces a work piece into the machine beneath the steering disk and over the idler and supporting rolls so that an edge is positioned against curvature sensing means. Although this controlling edge may constitute the workpiece periphery, it is to be noted that work formations such as grooves or ribs and even formations not on the work can suffice to define the edge determining the work steering action.

For controlling the steering of the work the steering disk is independently driven by a servo motor having operative connection to the just mentioned sensing means which is responsive, as herein shown, to the curvature of the work piece just ahead of the skiving knife. The sensing means is herein illustrated as a linear variable differential transformer, a finger thereof normally being disposed to be displaced, against the influence of a return spring, by engagement therewith of the marginal edge about to be skived. As will be described it is usually, though not always, advantageous to include a fixed edge gage, a presser foot of unique construction preferably being included in novel combination when the edge gage is omitted or the sensor itself is additionally serving to some extent as an edge guide. The sensing means may for some types of work be in the form of a photoelectrically controlled circuit, if desired. A displacement type of curvature sensor will be recognized as of particular merit where sensing is taken from a physical characteristic (such as a groove or rib) in or off the work, and other suitable sensing means would be incorporated for steering purposes when required to be responsive to reflective or other marking on or off the work.

In accordance with another feature of the invention improper introduction of a work piece into the machine causes the steering disk automatically to eject it without harmful operation of the machine, but correct introduction releases the sensing finger to permit automatic feeding of the work to the skiving knife. Starting a work piece properly, as disclosed in accordance with a further feature, results in a photo-voltaic cell signaling for operation of an electric corner counting mechanism whereby, upon a selected number of corners of the work traversing the operating tool, the work is forthwith ejected from the machine.

The above and other features of the invention, together with various novel details of construction and combinations of parts will now be more particularly described in connection with an illustrative embodiment of the invention as applied to upper leather skiving, and with reference to the accompanying drawings thereof in which.

Figure 1:
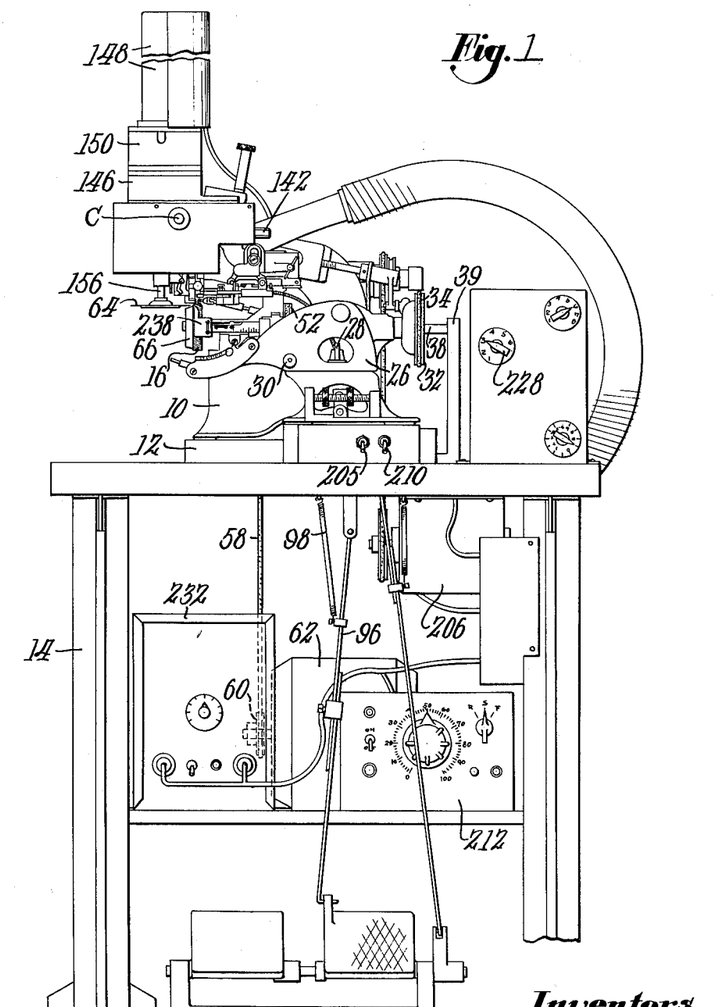
FIG. 1 is a view in front elevation of a bench mounted type of skiving machine incorporating the novel automatic work guidance mechanism of this invention, the machine being shown at rest with its control circuits deenergized.
Figure 2:
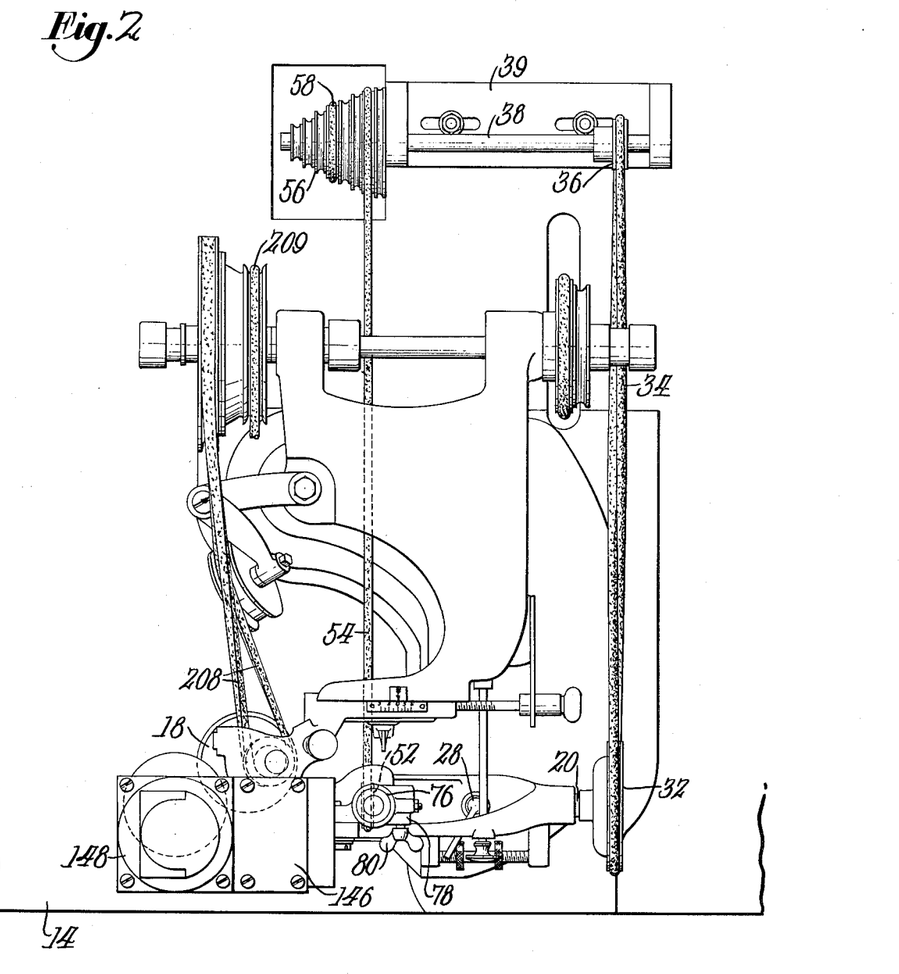
FIG. 2 is a plan view of the machine shown in FIG. 1, certain guards and auxiliary equipment being removed, and illustrating its driving mechanism.
Figure 3:
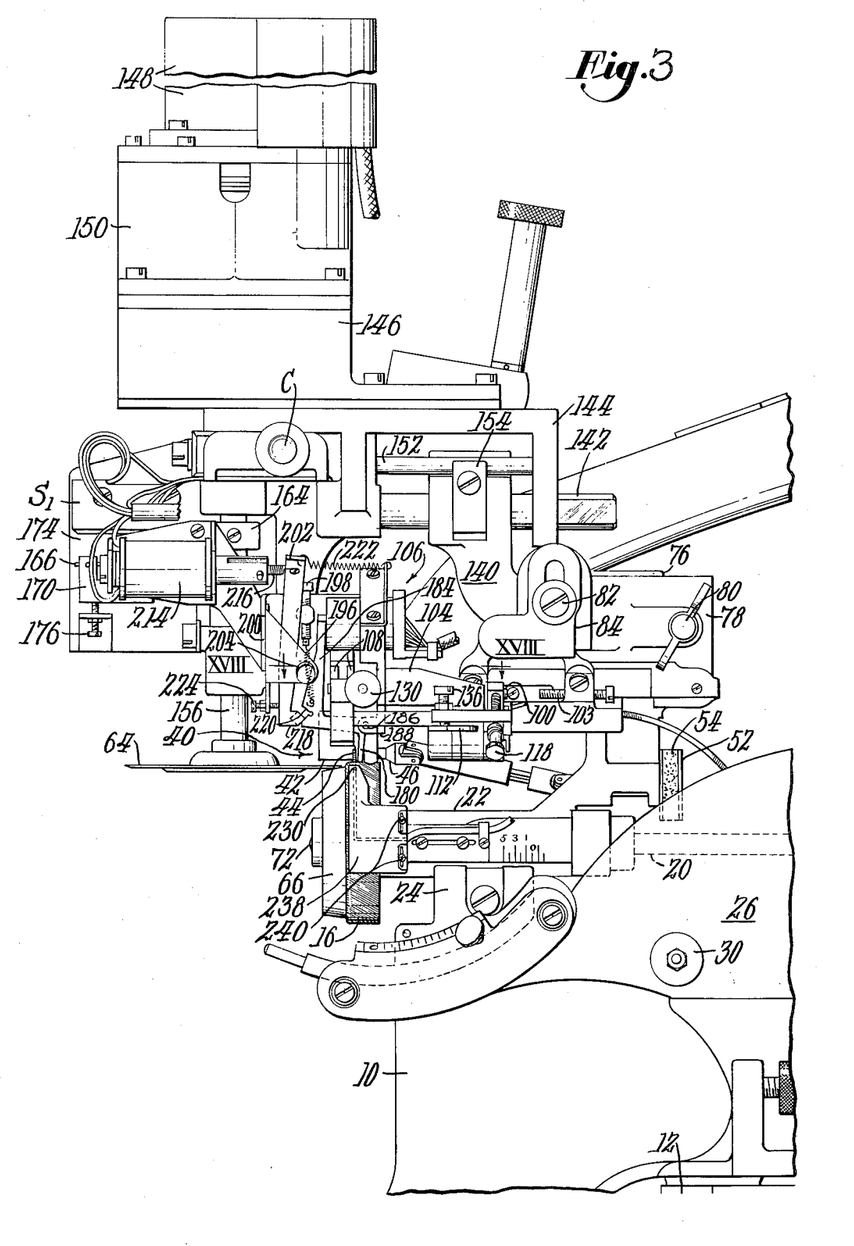
FIG. 3 is an enlarged view in front elevation of work guidance instrumentalities of the machine shown in FIG. 1, the machine being assumed to be turned to upright position and its inclined base removed.

Exclusive of the novel subject matter herein disclosed and claimed, the illustrative machine generally resembles that disclosed in United States Letters Patent No. 1,866,918, issued July 12, 1932 in the name of M. H. Ballard. In operating the patented skiver and others of its type, an operator assiduously exercises manual control over each work piece throughout its processing whereas by means of the automatic work guidance means incorporated as will hereinafter be explained he is relieved of considerable if not all tedium once a work piece is introduced to the machine. Better to facilitate such introduction and to observe operation of the machine, its frame 10 is now preferably inclined upon a wedge-like base 12 (FIG. 1) secured on a bench 14. As in the prior organization a work supporting rotary feed roll 16 (FIGS. 1, 3 and 7) feeds the work away from the observer as viewed in FIG. 1 toward an operating tool here shown in the form of a disk-shaped skiving knife 18 (FIGS. 11, 15, 16 and 17). A drive shaft 20 (FIGS. 2, 3, 4 and 7) for the feed roll 16 extends in a block 22 which is horizontally adjustable in a carrier 24. The latter, as formerly, is adjustable by treadle in a curved guideway in the outer end of an arm 26, the center of curvature of this guideway being at the upper inner corner of the roll 16 when the block 22 is adjusted to zero position on its scale. For moving the feed roll relatively to the knife 18, the arm 26 is adjustable about the vertical axis of a stud not shown but threadedly carrying a clamp lever 28 (FIG. 1) by turning a thumb screw 30 (FIGS. 1 and 3). The shaft 20 is connected with a pulley 32 (FIGS. 1 and 2) driven by a belt 34 from a small pulley 36 (FIG. 2) on a jack shaft 38 (FIGS. 1 and 2). This shaft is journalled in a bearing bracket 39 secured on the top of the bench 14.

Figures 4, 5:
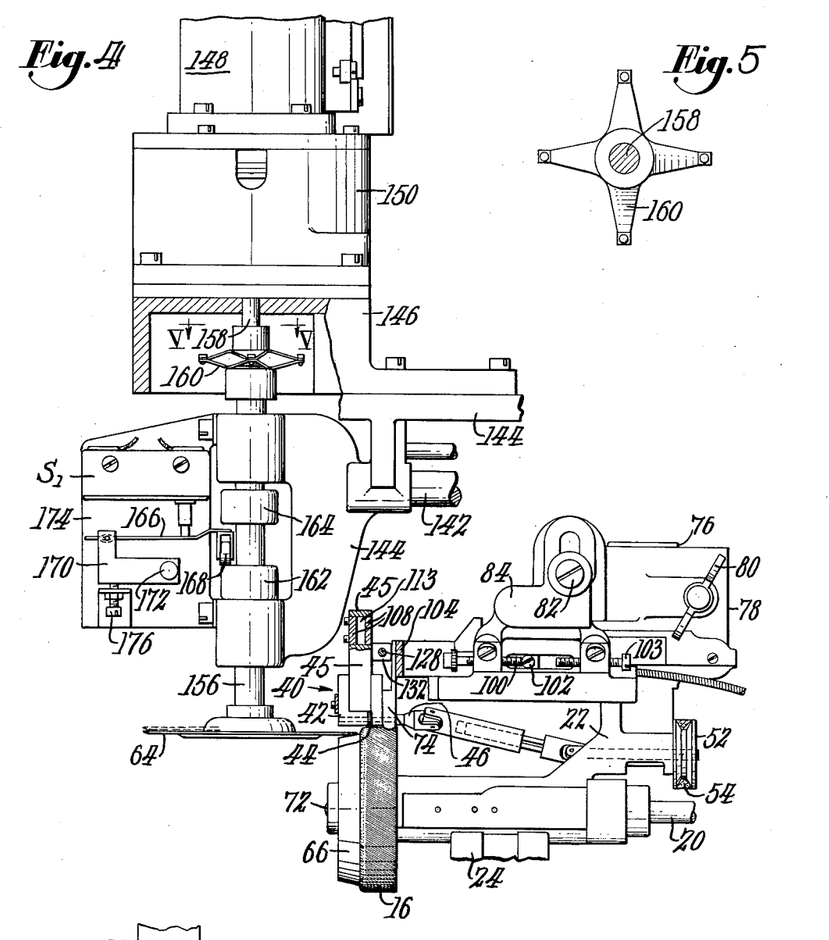
FIG. 4 is a view corresponding to FIG. 3 with portions broken away better to reveal construction details pertinent to work feeding and guidance means including a servo controlled steering disk.
FIG. 5 is a section taken on the line V—V of FIG. 4 and showing a spring coupling in the driving connections to the steering disk.
Figure 6:
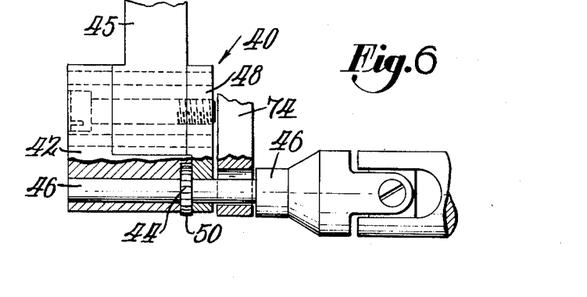
FIG. 6 is an enlarged detail view, partly in section, of a presser foot assembly with feed wheel and fixed edge guide as shown in FIG. 4.
Figures 11, 13:
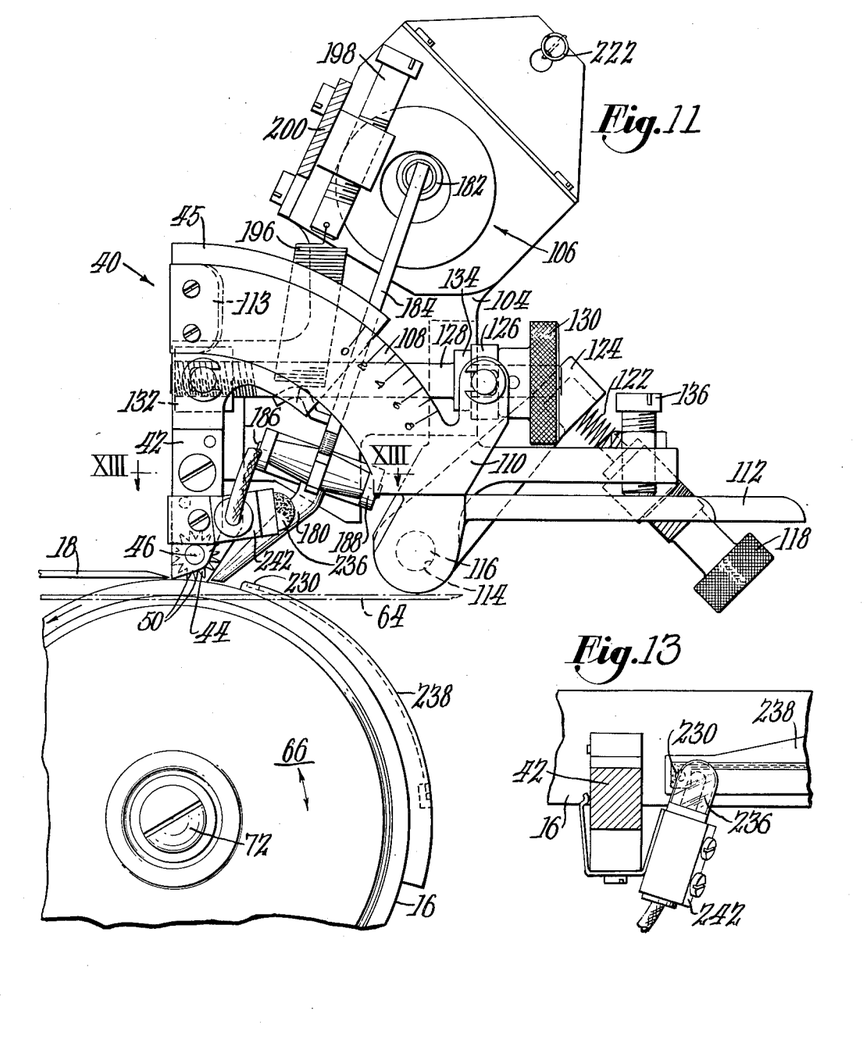
FIG. 11 is a view in side elevation of operating parts including the edge guide, a skiving knife, and a presser foot assembly in relation to the work supporting rolls, a transformer type curve sensing device, and a portion of electronic corner counting means.
FIG. 13 is a section taken on the line XIII—XIII of FIG. 11 indicating the mounting of a light source for a cell of the corner counting means.

In the illustrative arrangement shown in FIGS. 1–15 inclusive, a presser foot assembly generally designated 40 (FIGS. 3, 4, 6, 7 and 11) is disposed to cooperate with the feed roll 16 and includes a presser foot 42 and a driven feed wheel 44 (FIGS. 3, 4, 6, 7 and 11) for urging the work toward the knife. The presser foot 42 is secured to a depending arm of a swivel block 45 (FIG. 11) having a curved guideway, and is bored to receive the reduced end portion of a short shaft 46 (FIG. 6) on which the wheel 44 is integrally formed. A bearing 48 (FIG. 6) secured to the side of the presser foot is formed to receive the shaft 46 and thus nests the wheel 44 except for a lower exposed work engaging portion thereof. In operating upon upper leather, and in machines of the present type the work pieces beneath the knife and waste above it, the wheel 44 preferably is formed with equally spaced teeth 50 (FIGS. 6 and 11). In order that these teeth shall not be the cause of jamming of the work, for instance against an edge gage when one is employed, it is often desirable that the work engaging portions of the teeth be crowned or rounded to permit relative movement of the work transversely of the direction of feed. For operating the feed wheel 44 at substantially constant speed corresponding to the peripheral speed of the roll 16, the shaft 46 is connected through universal joints to a pulley 52 (FIGS. 2, 3 and 4). This pulley is connected by an endless belt 54 to a multiple sheave 56 (FIG. 2) fast on the jackshaft 38, the latter being driven by a belt 58 (FIGS. 1 and 2) selectively connecting one of the grooves of the sheave 56 with the driving pulley 60 of a motor 62 (FIG. 1) mounted on a shelf of the bench 14.

Figures 7, 8:
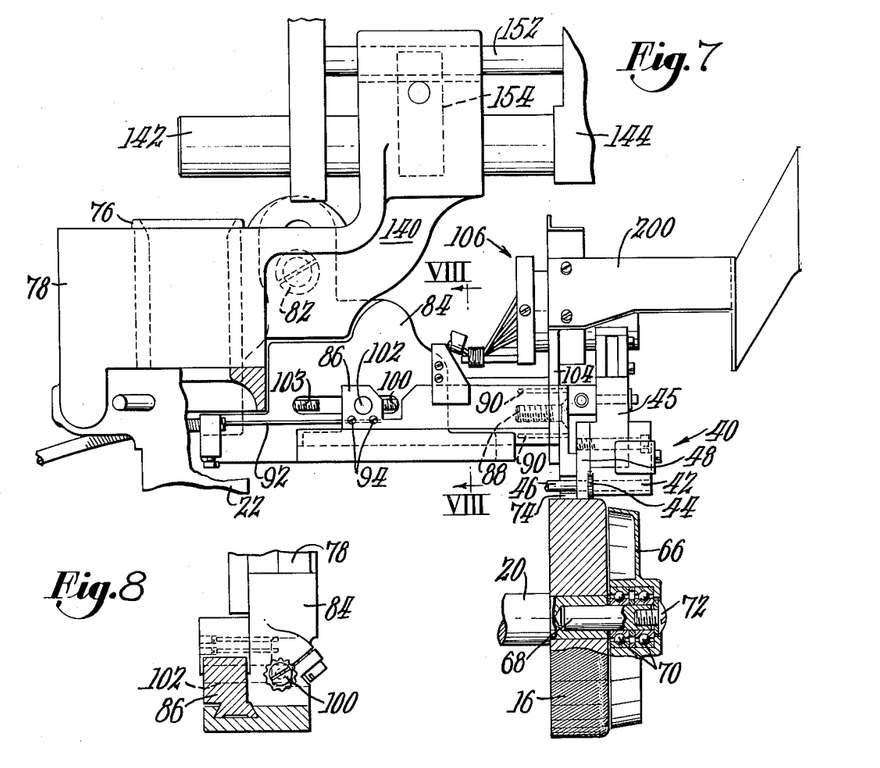
FIG. 7 is a view in rear elevation largely corresponding to FIG. 4 but showing the mounting of work supporting rolls and associated work controlling means including a retractable edge guide.
FIG. 8 is a section taken on the line VIII—VIII of FIG. 7.

For automatically steering the work with respect to the knife 18 and as herein illustrated, an outer member or wheel 64 (FIGS. 1, 3, 4 and 15) in the form of a rotary steering disc is arranged to cooperate with the canted periphery of an auxiliary work supporting roll 66. The drive of the disc 64 is solely under the operating control of curvature sensing means later to be described, but the roll 66 is, as indicated in FIG. 7, mounted for free rotation coaxially with the roll 16. Accordingly, an end of the shaft 20 is bored to receive in press fit one end of a pin 68 the other end of which carries ball bearings 70 supporting the roll 66 and a retaining washer and a screw 72. Cooperating with these steering means and the presser foot assembly 40 in the guidance of the sheet material to be fed is a retractable, normally fixed edge guide 74 (FIGS. 4, 7, 9 and 15). The mounting of this guide and its associated presser foot assembly, next to be explained, is important and its adjustment generally somewhat critical to the successful, versatile and accurate performance of any machine embodying work guidance means in accordance with the invention. An upwardly extending end portion of the block 22 serves as a hollow, cylindrical bearing member 76 (FIGS. 2, 3, 4 and 7) for a later-mentioned carrier 78 for the steering disc 64, a pinch-screw 80 adjustably clamping this carrier and hence the disc 64 in selected operating position. Secured to the carrier 78 for heightwise adjustment by means of a screw 82 and its washer is a bracket 84 (FIGS. 3, 4 and 7) having a vertical slot for receiving the screw. The bracket 84, as indicated in FIGS. 7 and 8, is dovetailed to receive a horizontally movable slide 86 to the outer end of which the edge guide 74 is secured by a screw 88 (FIGS. 7 and 9) and a pair of dowel pins 90, 90. Thus, in-and-out movement of the guide is effected by means of a treadle actuated cable 92, the cable being secured at one end to the slide 86 by a pair of screws 94, 94, and at the other end to a treadle rod 96 (FIG. 1). For adjustably determining the operating position of the edge guide 74 a tension spring 98 (FIG. 1) connecting the rod 96 to the bench 14 urges the guide 74 outwardly or toward a workpiece to the extent permitted by a stop screw 100 (FIGS. 3, 4 and 7) threaded through the bracket 84 to extend into a horizontal slot therein, the screw 100 being arranged to abut a boss 102 laterally projecting from the slide 86. The limit of movement of the guide away from the work is determined by a stop screw 103 adjustably threaded into the bracket 84 for engagement with the boss 102.

Figure 9:
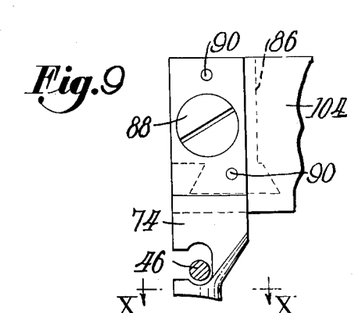
FIG. 9 is an enlarged side elevation of the mounting of the edge guide shown in FIG. 7.
Figure 10:
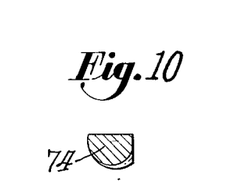
FIG. 10 is a section taken on the line X—X of FIG. 9.
Figures 18, 28:
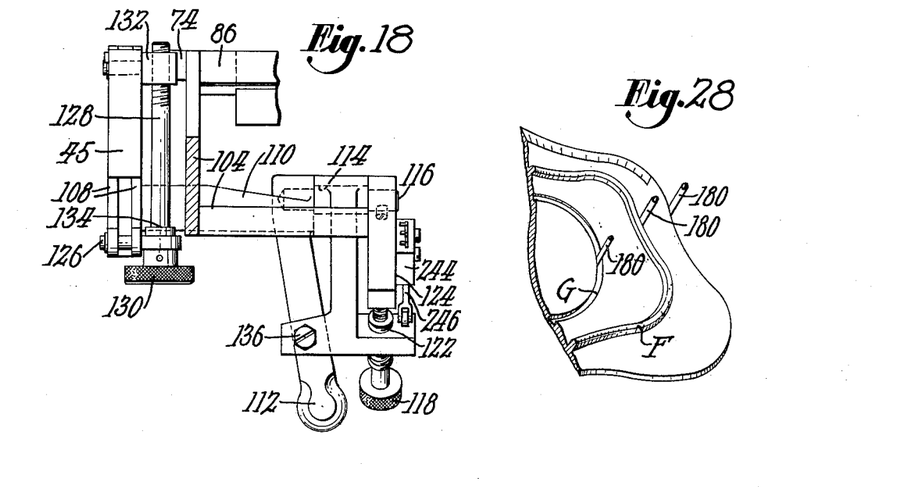
FIG. 18 is a section taken on the line XVIII—XVIII of FIG. 3 indicating manual means for operating the presser foot assembly and actuating electrical means for rejecting the work prior to improper operation thereon.
FIG. 28 is a perspective view of a work piece providing different forms of guidance controlling curvature.

Referring to FIGS. 7 and 9, the screw 88 and the pins 90 also secure to the slide 86 a mounting member 104 which is formed to support the presser foot assembly 40, as next explained, and also a linear, variable, differential transformer, generally designated 106 (FIGS. 3, 7, 11, 14 and 26), of the above-mentioned curvature sensing means. In order to insure that the presser foot 42 and its feed wheel 44 may be suitably adjusted relative to the work, the arcuate guideway of the block 45 (FIG. 11) accommodates a forked and correspondingly curved gage portion 108 of a swivel piece 110 (FIGS. 11 and 18) having a presser foot lifting handle 112 extending toward the front of the machine. An end of the portion 108 is bridged by a spacer 113 (FIG. 11) secured to the piece 110 and nested in the block 45. For lifting the presser foot assembly 40 from its operating position (as when releasing a workpiece) by manually depressing the handle 112, the member 104 is formed with a horizontal bore 114 (FIGS. 11 and 18) for receiving a pivot pin 116. An end of the latter serves as a fulcrum for the piece 110 and thus the presser foot is shifted together with the block 45. The presser foot 42 and its wheel 44 normally are urged downwardly into operating position by means now to be explained. As indicated in FIGS. 11 and 18, a thumbscrew 118 is threaded through a bore formed in an arm of the member 104. A reduced upper end of the screw 118 is received in one end of a spring 122, the other end of which bears upwardly on an end of a lever 124 the other end of which is affixed on the pin 116 by a setscrew. Accordingly, by means of the screw 118 the pressure with which the presser foot and its wheel 44 engage the work may be suitably adjusted for different types and thicknesses of sheet material. A scale on the portion 108 is useful in indicating selected heightwise adjustment and traction of the trailing edge of the presser foot 42 with respect to the work. Preferably the axis of the wheel 44 is coaxial with the center of curvature of the gage portion 108 which can be suitably adjusted about this center by means next to be described. Still referring to FIGS. 11 and 18, an upwardly extending ear of the swivel piece 110 is bored to receive an arm of a bearing stud 126. An adjusting screw 128, to one end of which a knurled knob 130 is secured, extends through a hole in the stud 126, and the other end of the screw 128 is threaded into a swivel adjusting nut 132 having a projecting portion anchored in a bore in the block 45. The screw 128 is held against axial movement by means of an integral collar 134 thereon abutting the stud 126. Thus turning of the knob 130 raises or lowers the presser foot trailing edge to modify traction as may be desired. For limiting turning movement of the presser foot assembly 40 counter-clockwise, as seen in FIG. 11, about the axis of the pin 116 and thus avoiding interference between the wheel 44 and the feed roll 16 when there is no leather in the machine, a stop screw 136 adjustably threaded through an arm of the member 104 is arranged to be engaged by the arm 112 which is urged into such engagement by the spring 122.

Coming now to the mounting of the work steering disc 64, as shown in FIGS. 3 and 7 the carrier 78 is formed with an upwardly extending bearing portion 140 that is horizontally bored to receive a bar 142. This bar supports a laterally slidable bracket 144 (FIGS. 3, 4 and 7) to which an adaptor 146 for mounting a servomotor 148 (including tachometer generator) and its reduction gear housing 150 is secured. The bracket 144 is provided with a guide rod 152 parallel to the bar 142 and, in cooperation with a dog 154 in contact therewith and secured to the bearing portion 140, enables the point of frictional contact of the steering disc 64 with a work piece to be moved axially of the idler roll 66 if need exists. A vertical drive shaft 156 (FIGS. 1, 3 and 4) for the steering disc 64 is operatively connected to the servomotor 148 through reduction gearing (not shown) in the housing 150. In order to admit sheet material beneath the work engaging surface of the steering disk 64 and for control purposes later explained, the shaft 156 is vertically displaceable, it having coaxial spaced bearings in the bracket 144 and being secured to the lower half of an anti-backlash spring coupling 160 (FIGS. 4 and 5) which has its upper half connected to an output shaft 158 of the reduction gearing. The arrangement accordingly is such that when the machine is inoperative and no work has been introduced between the steering disc and the idler roll 66, the coupling 160 urges the disc 64 downwardly to the extent permitted by a collar 162 (FIG. 4) on the shaft, the collar 162 then abutting the lower bearing for the shaft 156. A collar 164 on the shaft 156 is arranged to limit upward movement of the latter by engagement with the bracket 144. For control purposes later explained, a work detector microswitch S1 (FIGS. 3, 4 and 26) is disposed to be actuated by a leaf spring 166 having one end provided with a follower roll 168 for riding upon the collar 162, the other end of the spring 166 being supported by a lever 170. This lever is pivoted by a pin 172 to a bracket 174 mounting the switch S1 and secured to the bracket 144. By way of suitably adjusting the leaf spring 166 heightwise to modify the time of actuation of the switch S1 for various thicknesses of work to be accommodated, a setscrew 176 (FIGS. 3 and 4) is threaded heightwise through a projection of the bracket 174 for endwise abutment with the free end portion of the lever 170.

Figure 25:
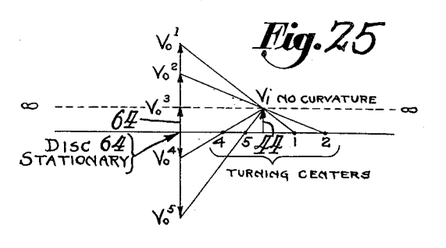
FIG. 25 represents vectorially, different steering couples effected by the steering disc and inner feed wheel.

In order to exert force for steering a work piece in a straight line toward the knife 18, the steering disk 64 would be driven by the servomotor 148 at substantially the same peripheral speed and in the same direction as that of the inner, constant speed feed wheel 44. This condition is vectorially represented in FIG. 25 by the equal length arrows $V_o^3$ and $V_i$ assigned respectively to the steering disk 64 and to the feed wheel 44. Frequently, however, it is necessary or desirable to steer the work relatively to a tool, in this case the knife 18, according to some prescribed or predetermined path that is not straight or not entirely straight. If, as in the case of the illustrative machine, the tool is to have an operating path (preferably of constant width) along the periphery of the irregularly shaped work, the changing curvature of this periphery must then continuously control the steering coupling to be effected by the disc 64 by suitably varying $V_o$, the velocity of the disc 64. Accordingly, as herein shown the curvature sensing means including the transformer 106 is responsive to the varying edge curvature of the shoe upper or other work in a locality just ahead of the work-engaging point of the edge guide 74. Thus deviation of the curvature is felt in this case by an edge-engaging finger 180 (FIGS. 3, 11, 15 and 26) and resultant linear displacement of a core 182 (FIG. 26) of the transformer from its neutral position is effectively transmitted as an input signal to the servomotor 148 via associated electrical control means later to be described. It will be understood that in the use of the differential transformer 106 core displacements changing amplitude are determinative of the speed of the steering disc 64, and core displacements through neutral change phase to signal for change in direction of that speed. Were a tool to have an operating path other than along or near the boundary of a work piece, or even in some cases where the path is determined by a boundary, it is apparent that the curvature sensing means may be of the same or different form and type, and cooperate with other than outer edge curvatures, for instance those of ribs F or grooves G (FIG. 28) on or off the work and having appropriate physical characteristics for producing the desired response in said sensing means thus causing the disc 64 (or an equivalent work engaging member) reversibly to exert steering vectors for shifting the work according to the predetermined dictates of the selected curvature. Referring again to FIG. 25, except for the case wherein a tool operating path is to be of circular shape and is to be imposed on a work piece by a substantially constant velocity $V_o$ (other than $V_o^3$) affording a fixed center for the turning of the work, the varying velocity of the disc 64 results in instantaneous turning centers such as those designated 1, 2, 4 and 5 which lie upon and shift along a line extending through the points of work engagement of the disc 64 and the wheel 44, thus distinguishing from the modus operandi of the guidance mechanism disclosed in the Schaefer et al. application referred to above.

Figures 26, 27:
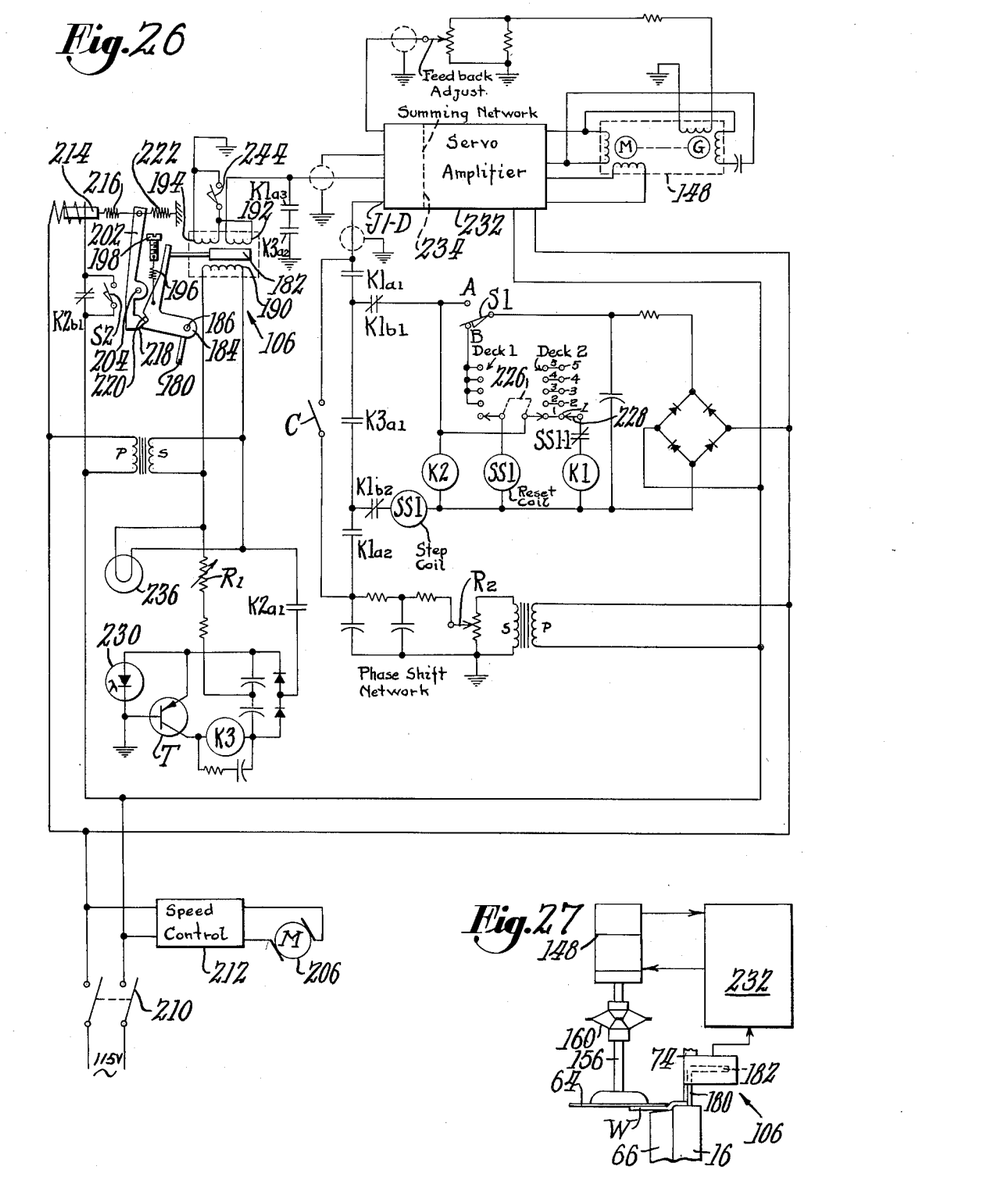
FIG. 26 is a simplified schematic wiring diagram of an electric control system for the illustrative machine incorporating work ejecting means responsive to a corner counting system.
FIG. 27 is a diagrammatic view of the basic work guidance means of this invention.

The sensing finger 180 (FIGS. 11, 15 and 26) constitutes an angularly depending portion of a lever 184 (FIGS. 3, 11 and 14) pivotally supported on a pin 186 journaled in a bracket 188 secured to the normally fixed member 104. The upper end of the lever 184 is connected to the core 182 which is thus axially displaceable relatively to a primary coil 190 (FIG. 26) and a pair of series, opposed secondary coils 192, 194 of the transformer 106. Yieldingly resisting counter-clockwise movement of the sensing lever 184, as viewed in FIGS. 3 and 26, is a tension spring 196 the upper end of which is connected to an adjusting screw 198 (FIGS. 11 and 26) threaded through an ear of an angle bracket 200 secured to the member 104. When the machine is idle and its circuits are not energized, the condition shown in FIGS. 3 and 26, the primary coil 190 is unenergized and the sensing lever 184 is uncaged, i.e., it is not hold against movement by a caging lever 202 (FIGS. 3, 14 and 26) which is pivoted on a pin 204 in a projection of the bracket 200. However, when operation of the machine is to be commenced one power switch 205 (FIG. 1) is closed to energize a motor 206 operating the knife 18 through a driving belt 208 (FIG. 2) and a grinder (not shown) therefor, by its belt 209, and another power switch 210 (FIG. 1) is closed to energize a variable speed controlled 212 for the feed roll motor 62, the primary coil 190, various heater filaments of the electrical control system, and a solenoid 214 (FIGS. 3, 14 and 26), the latter being connected through a normally closed switch K2b1 (FIG. 26). For reasons to be explained this solenoid 214, which is mounted on the bracket 200 thereupon acts through a spring 216 connected to the upper end of the caging lever 202 yieldingly to cause a projecting V-shaped end 218 of the latter to cage the sensing lever 184 by becoming seated in a correspondingly shaped notch 220 therein. Upon deenergization of the solenoid 214 a return spring 222 (FIGS. 3 and 26) connecting the upper end of the lever 202 with a bracket adjacent to the member 104 effects uncaging of the sensing lever 184. A set screw 224 (FIGS. 3 and 14) threaded through a depending arm of the bracket 200 cooperates with the spring 222 in determining the inoperative position of the caging lever 202.

Figure 19:
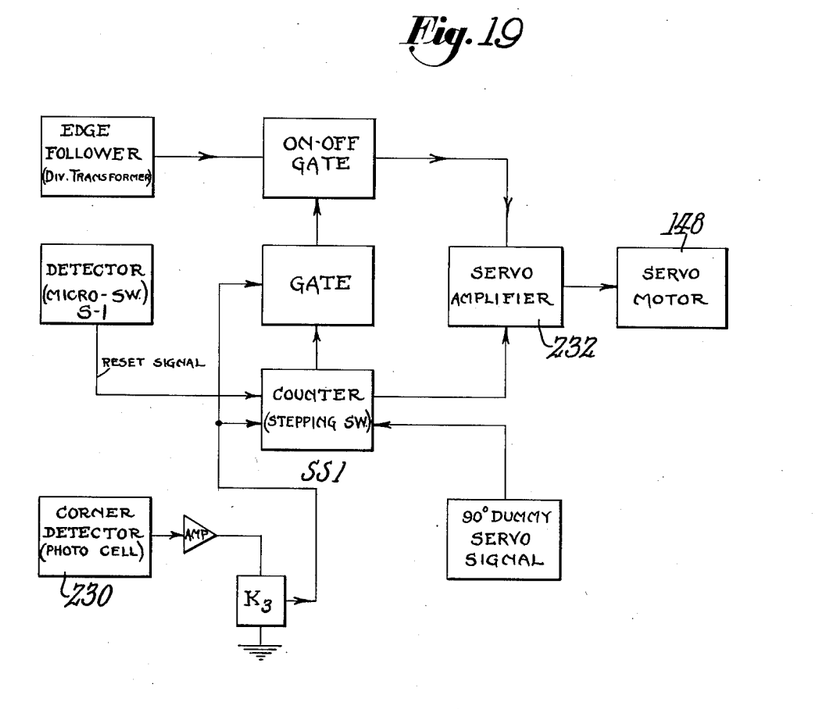
FIG. 19 is a block diagram of a system for automatically effecting removal of the work after a predetermined number of work corners have traversed the skiving knife.

By initially caging the curvature sensing means as just indicated at the moment of introducing a work piece into the machine, the finger 180 is made to serve as a guide for accurately locating the operating path on the work of the knife 18. That is to say, the caged finger 180 is thus prevented from causing the differential transformer 106 to transmit an abrupt, operator-imposed first signal to the servomotor 148 which could result in the knife damaging the work piece. The position of the core 182 while the finger is caged is substantially neutral and such as to signal the servomotor to cause the wheel 64 to advance the work along a selected feed in direction. In connection with FIGS. 19 and 26 it may be observed that in addition to the feature just mentioned, more refinements in work control are herein shown and to be explained than are sometimes required or, at times, desirable for steering work pieces, especially those on which only gently curving tool-operating paths are to be imposed. It will often suffice in simpler cases merely to pick up electrical signals (as diagrammatically illustrated in FIG. 27) from displacements of the transformer core 182 and transmit them via the secondary coils and suitable amplifier means to the servomotor 148. Incidentally, manual closure, during operation of the machine, of a switch S2 (FIG. 26) causes the sensing lever 184 to be caged by operation of the solenoid 214 to effect workpiece ejection. The control system of FIG. 26 includes, for purposes of illustration, a later explained work rejecting mechanism guarding against improper admission of the work, and next to be described corner counting circuitry whereby the work, after the curvature sensing means has been caused to traverse a selected number of successive localized curvatures or "corners," is automatically fed out of the machine. In connection with these features and as will next be explained with particular reference to FIG. 26, the sensing finger is immediately and automatically uncaged by presenting the work thus permitting continued operation of the machine under work guidance control. To this end, as the work is inserted beneath the steering disc 64 and over the idler roll 66, the work margin to be skived is directed toward the sensing finger 180. The leather or other work is initially seized by the toothed feeding wheel 44 and/or the steering disc 64 to be advanced thereby. Accordingly the thickness of the work causes an upward movement of the steering disc 64 against the influence of the anti-backlash coupling 160, resulting in the shifting of the switch S1 to close its contact A and open its contact B. Consequently circuits are completed to energize relay K2, and set up a potential across a contact K3a1, and across a wiper arm 226 (FIG. 26) to deck 2 of a stepping switch SS1. Assuming that a manually set corner count selector switch 228 (FIGS. 1 and 26) is set at position 1, as shown in FIG. 26, a voltage is supplied to a relay coil K1 through interrupter contacts SS1–1 of a hereinafter mentioned stepping switch coil SS1 arranged to operate the arm 226. In these circumstances the switch K2b1 is opened to deenergize the solenoid 214 and uncage the sensing means, a switch K2a1 (FIG. 26) is closed to energize a network which includes a relay K3 for energizing an ejector or kickout signaling circuit, a transistor T and a light-actuated element such as a solar cell 230 (FIGS. 3, 11, 13 and 26), and a pair of normally closed contacts K1b1 and K1b2 (FIG. 26) is opened. Also subject to a condition about to be stated, contacts K1a1 and K1a2 are now closed by the relay K1 to complete the kick-out-signaling circuit from an eject-adjust potentiometer R2 in a 90° phase shift network to terminal J1—D of a suitable servo amplifier 232 (FIGS. 1 and 26) (including in FIG. 26 but not in FIG. 27 a summing network generally designated 234) interconnecting the transformer secondary coils 192, 194 and the servomotor 148 as shown. The required condition for completing this circuit is that a contact K3a1 be closed by operation of the relay K3, and the latter is energized each time light from a bulb source 236 (FIGS. 11, 13 and 26) is received by the cell 230 sufficiently to trigger the transsistor amplifier T, i.e., when a localized curvature or "corner" of the work has transversely passed over the cell and does not obstruct incidence of the light upon the cell. The latter is herein shown (FIGS. 3, 11 and 13) as being mounted in an arcuate bracket 238 partially shielding the roll 16 and adjustably secured to the block 22 by screws 240 (FIG. 3). The arrangement is such that the cell is precisely positioned ahead of and relatively to the sensing finger 180 to define what curvature shall constitute an effective corner for eject signalling purposes. The bulb 236 is supported by its socket 242 which is bracketed to the presser foot 42. The signal input to the servo amplifier, when the relay K3 has shunted the transformer 106 by closing a contact K3a2, is thus effective for a selected setting of the potentiometer R2 to cause the servo motor 148 to command the disc 64 to speed in a direction to feed the work out of the machine in the shortest time practicable. Due to particular work piece contour other selected feed out directions may advantageously be imposed on the work by other settings of the potentiometer.

In presenting any work piece to be operated upon, one of two possible starting conditions may prevail owing to the fact that configuration of a work piece in the operating zone either will cover the solar cell before the contact A of the work detector switch S1 is closed by the work or after it is thus closed. In the first mentioned case, operation of the relay K3 being initially prevented, time is available before the curvature sensing means becomes uncaged for the work edge to be properly placed against the finger 180 whereupon the mechanical closing of the work detector contact A energizes the relays K1 and K2 with the result above noted. In the second case, light from the bulb 236 is received by the cell 230 at the same time that the contact A is closed and the relays K1 and K2 are energized, but a "feed-in delay adjust" potentiometer R1 in the cell network delays the buildup of potential to the relay K3 thereby affording time for the complete operation of the relays K1 and K2. When, in the course of feeding, the first corner on the work uncovers the cell, the relay K3 is energized to close normally open contacts K3a1 and K3a2 (FIG. 26), the latter thus shorting to ground a signal from the transformer 106 (through a contact K1a3 which had been closed by the energized relay K1) while the ejector-adjust potentiometer R2 creates a dummy error signal that is transmitted via the closed contact K3a1 to the servo amplifier 232. Hence, this eject signal commands a definite, controlled rotative steering disc speed automatically causing the work to be fed out of the machine in the desired direction. It is found by experience that this is a valuable feature in skiving machines, for instance, since the appearance or quality of the skive at ejected corners is largely dependent upon the then relative operating speeds of the disc 64 and the feed wheel 44.

The corner counting work ejecting system will next be described with reference to FIG. 26 assuming an automatic feed out of the work is wanted at its second corner (operation would be the same for the second corner ejection signal by any predetermined shape having curvature which might be substituted for guidance in lieu of the irregular work periphery). The corner count selector switch 228 is first manually shifted to the position designated 2 in deck 2 to produce the following sequence. Closure of the contact A of the switch S1 by entry of the work supplies a potential across the contact K3a1 and to the wiper arm 226 at deck 2 of the stepping switch SS1, and energizes the relay K2. The relay K1 does not now get energized since the selector switch 228 has moved from its position designated 1. As in the previous situation, the contact K2b1 is opened by the relay K2 to uncage the finger 180, and the solar cell network is energized by the closure of the contact K2a1. At the first corner of the work the solar cell will be uncovered to permit light to be directed onto the cell whereby the relay K3 becomes energized. Since the relay K1 has not been energized (the switch SS1–1 opens only when the step switch SS1 starts to advance), the energizing of the relay K3 does not at this time effect any changes in the signal from the differential transformer 106 since contacts K1a1, K1a2 and K1a3 remain open. The relay K3, however, does operate the step coil SS1 through the contacts K1b1 and K1b2. As the work is fed in the course of its guidance, at its second corner the relay K3 is again energized and now causes contacts of the wiper arm 226 to be shifted one step in decks 1 and 2 and hence energizes the relay K1 causing the work piece promptly to be ejected from the machine as previously described for the single corner count. It will be understood that if feed-out at a subsequent corner is desired the selector switch 228 is correspondingly adjusted and the stepping switch will advance the required additional steps as explained to energize the relay K1. After a work piece has been ejected from beneath the steering disc 64, the detector switch contact A opens and B recloses to energize a reset coil SS1 whereby the wiper arm is returned to its shown starting position. In the event it is desired to operate the machine without the corner counting system controlling ejection of the work, the bulb 236 may be disconnected. A switch C (FIG. 26) is closed manually whenever it is desired to have the work ejected from the machine, the control signal then going to the servo amplifier directly from the phase shift network.

Figure 12:
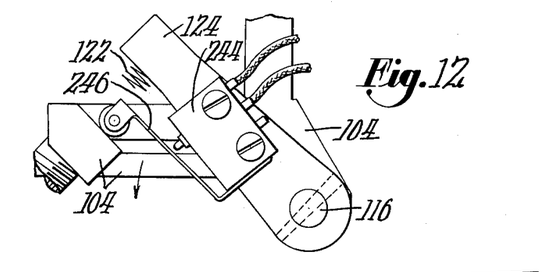
FIG. 12 is a view in end elevation of manually operable work ejecting control mechanism shown also in FIG. 18.

It is sometimes desirable to test-skive just a very small portion of a work piece to verify that the machine is adjusted to perform as desired and without causing the piece to bceome ruined should machine adjustments not be entirely correct. Accordingly, a microswitch 244 (FIGS. 12, 18 and 26) is secured to the lever 124 and provided with a spring actuator arm 246 one end of which is arranged to abut the fixed member 104. Thus upon making a test run, or in the event of an emergency such as the jamming of work in the machine, an operator may free the work piece by depressing the lever 112 to lift the presser foot 42 and thereby simultaneously swing the lever 124 in the direction of the arrow in FIG. 12 to close the switch 244 and thereby short-circuit the secondary coil 194. This results in inverting the phase of the output signal from the transformer 106 and consequently reverses rotation of the steering disc 64 to effect return or rejection feed of the work piece before possible damage is done. The steering disc 64 also reverses to effect rejection of work when a work piece has not been entered into the machine sufficiently to have its edge against the sensor finger 180, the transformer then acting upon being uncaged to prevent an incorrect operation on the work.

Figures 14, 15:
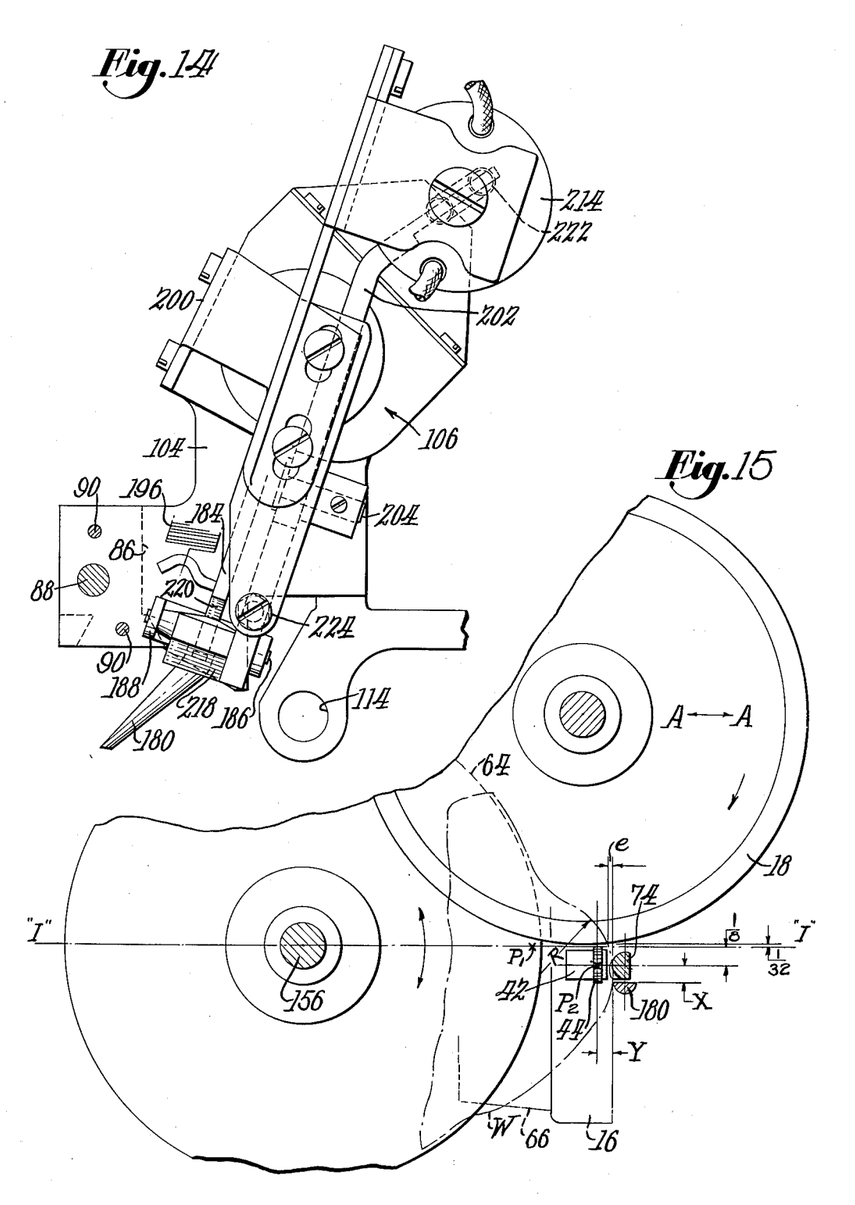
FIG. 14 is a view of the curvature sensing device shown in FIG. 11 illustrating its mounting and indicating cooperative caging means.
FIG. 15 is a diagrammatic plan view of one arrangement of the guidance mechanism including the steering disk, feed wheel, fixed edge gage and sensor in relation to a skiving knife.
Figure 16:
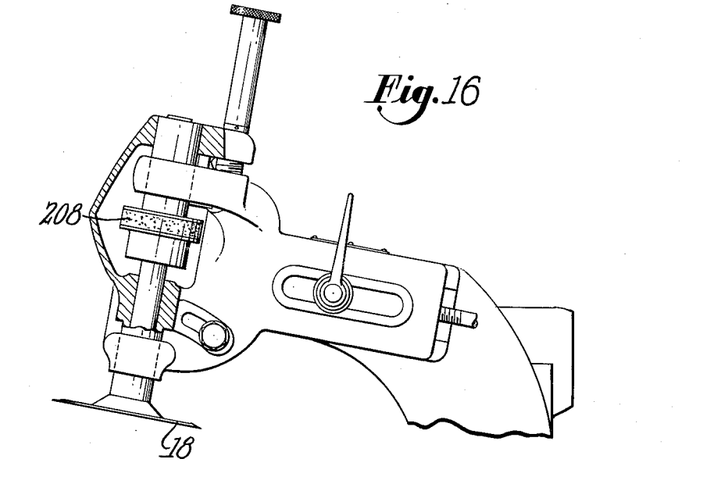
FIG. 16 is a front elevation partly in section of means adjustably mounting the skiving knife for movement in a direction indicated by the arrows A—A in FIG. 15.
Figure 17:
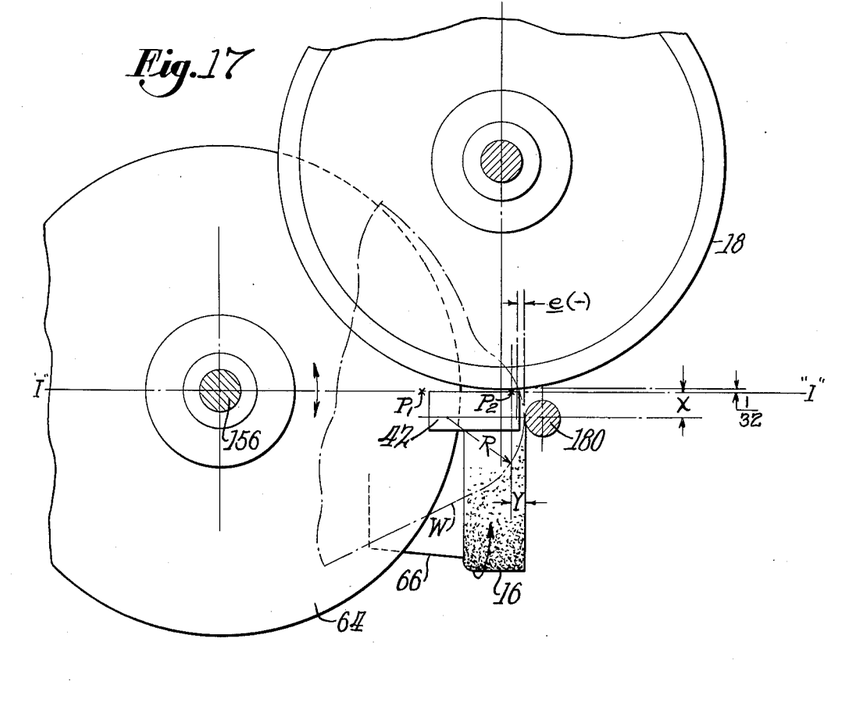
FIG. 17 is a diagrammatic plan view somewhat like that of FIG. 15 and showing an alternate arrangement of parts, a sensor partly acting as an edge guide, and a presser foot supplanting one feed member.
Figure 20:
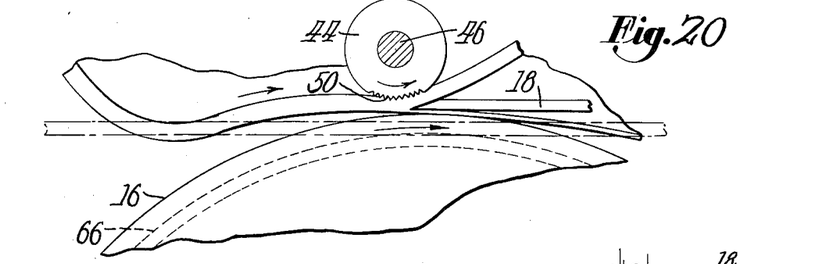
FIG. 20 is a schematic showing of a further alternative arrangement of parts, the skiving knife having its operative edge between a toothed feed wheel and its cooperative work supporting roll.
Figures 21, 24:
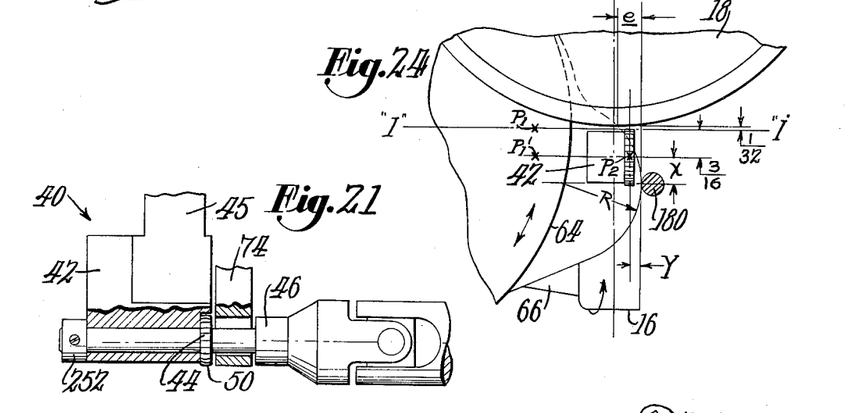
FIG. 21 is a modified presser foot assembly as adapted for narrow edge skiving.
FIG. 24 is, like FIGS. 15 and 17, a schematic plan view of an alternate arrangement of parts.
Figure 22:
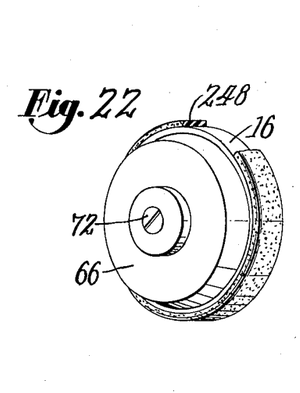
FIG. 22 is a modified work supporting feed roll especially useful on women's upper leather or other relatively flimsy sheet material to be operated upon.
Figure 23:
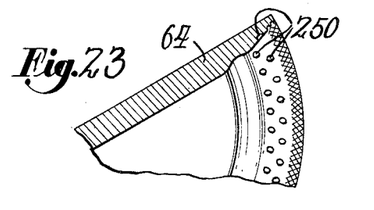
FIG. 23 is an angular view of a portion of a modified steering disc.

Referring now to FIGS. 15, 17 and 24 for comparison purposes some alternative geometric sensing arrangements have been shown wherein a work piece is being skived as it is being automatically guided about a radius R. In these cases $P_1$ represents the effective point of engagement of the steering disc 64 with the work, and $P_2$ represents the corresponding point for the feed wheel 44 or of the presser foot 42 if no feed wheel 44 is employed. In substantially straight line feed or when R is long, skive width will be uniform but in traversing relatively shorter inside or outside radii of curvature, an error $e$ may be expected resulting in addition to or subtraction from the normally desired uniform skive width. The point of work engagement of the sensing finger 180 is shown a distance designated $x$ ahead of the point $P_2$ and a distance designated $y$ to the right thereof when the finger is in neutral position. Reducing the dimension $y$ in relation to the dimension $x$ assists in stabilizing the servo controlled steering system, these permitting greater feed speed, but the dimension $y$ should not become so small that traction is wholly lost while operating on a sharp outside corner. Experience proves that reducing the dimension $x$ toward zero produces more uniform skive width, i.e. decreases the error $e$, but the servo system tends to become more sensitive necessitating a slower feed speed in order to yield better accuracy of skive width. Conversely, increasing the distance $x$ permits higher operating speed but decreases the accuracy of skiving width in traversing corners. Note that in FIGS. 17 and 20 the sensing finger serves partly as an edge gage whereas in FIG. 15, the usually preferred construction described above, the finger is closely positioned ahead of the fixed edge guide 74. A resilient covering 248 (FIG. 22), for instance of rubber, is particularly advantageous on the roll 16 for insuring that when processing certain types of work no decrease in friction will develop such that the steering couple available from the servomotor would be lost. Providing notches 250 (FIG. 23) in a work engaging surface of the steering disc 64 the outer margin of which is also knurled is likewise found effective to guard against loss of force in steering couples.

In FIG. 20 the trailing edge portion of the presser foot 42 has been omitted from between the feed wheel 44 and the knife 18 and the cutting edge of the latter has been located somewhat under the feed wheel. This is an acceptable arrangement for narrow edge skiving but not for variable bevel skives since it would not be possible to then tilt the feed roll 16. A modified presser foot assembly shown in FIG. 21 has also been found particularly advantageous in automatically guided narrow edge skiving machines. The wheel 44 is, it will be noted, disposed closely adjacent to the edge guide 74, a retaining collar 252 being secured to an end of the shaft 46.

Operation of the automatic work guidance mechanism of the machine is believed to be clear from the foregoing description. The individual parts and their relative arrangements for suitably steering different types of sheet material may change to some extent according to the nature of the operating tool and any auxiliaries. Experience has proven the work steering means of this invention effective, in leather skiving machines and in edge folding machines for finishing the margins of leather uppers for instance, at speeds in excess of the manual feeding speeds of experienced operators and with equal if not superior quality in the product.

Having thus described our invention what we claim as new and desire to secure by Letters Patent of the United States is:

1. Mechanism for steering a generally flat work piece with respect to a tool for operating thereon, said mechanism comprising an inner and an outer member engageable with the work, the inner member being mounted for unidirectional movement at substantially constant speed to feed the work piece toward the tool, the outer member being mounted for movement at variable, reversible speeds, and curvature sensing means for controlling said outer member to shift the work piece and cause the tool to operate thereon along a predetermined path.

2. Mechanism for steering a generally flat work piece with respect to a tool for operating thereon, said mechanism comprising an inner and an outer member frictionally engageable with the work, the inner member being mounted for unidirectional movement at substantially constant speed to feed the work piece toward the tool, and the outer member being mounted for independent movement at variable reversible speeds to steer the work as it is fed, said outer member being solely under the control of sensing means responsive to curvature of the work piece as its portion to be operated upon progressively approaches the tool.

3. In a machine having a tool for operating progressively on a flat work piece, work feeding and guidance mechanism comprising a fixed edge guide adjacent to the operating locality of the tool, edge sensing means arranged to be engaged by the work ahead of the guide, at least one work feeding wheel engageable with the margin of the work at a point proximate to the point of its contact with the edge guide, said wheel being operative at substantially constant speed to direct the margin past the guide and toward the tool, an outer wheel frictionally engageable with the work inwardly of its margin and substantially at a locality on the line extending through the two points mentioned, and means controlled by said sensing means for varying and, if need be, reversing the speed of said outer wheel to steer the work with respect to the tool according to the curvature of the edge of the work.

4. A machine as set forth in claim 3 wherein said sensing means is an electrical device in the form of a linear, variable differential transformer.

5. A machine as set forth in claim 3 and further characterized in that a rotatably driven work-supporting roll is arranged to cooperate with said work feeding roll to feed the work, and a freely rotatable auxiliary roll is arranged to cooperate with said outer wheel in gripping and steering the work.

6. A machine as set forth in claim 3 and further characterized in that a rotatably driven work-supporting roll is arranged to cooperate with said work feeding roll to feed the work, and a freely rotatable auxiliary roll is arranged to cooperate with said outer wheel in gripping and steering the work, and means mounting one of said rolls for adjustment toward and away from the tool to shift the locality of engagement of said one roll with the work relative to the locality of engagement of the other roll with the work.

7. A machine as set forth in claim 3 and further characterized in that said work feeding wheel is formed with peripherally spaced teeth for urging the work toward the tool, the work-engaging surfaces of the teeth being rounded to allow relative movement of the work transversely of the direction of feed thus avoiding jamming of the work against the edge guide.

8. A machine as set forth in claim 3 wherein the tool is a knife, said feed wheel is formed with work engaging teeth, and a presser foot is arranged to engage and smooth out the work as it is directed across the cutting edge of the knife, the trailing edge of the presser foot being interposed between the wheel and the knife and closely adjacent to said cutting edge.

9. A machine as set forth in claim 3 wherein the tool is a circular skiving disc, said feed wheel is formed with work engaging teeth for directing the work across the cutting edge of said disc, and the skiving zone of the cutting edge of said disc extends in close proximity to the work engaging locality of said teeth.

10. A machine as set forth in claim 3 and further characterized by mechanism for automatically, at a preselected corner of the work, signaling said sensor to cause the outer wheel to assume speed forthwith to steer the work directly out of the machine.

11. In a machine having a tool for operating on flat, flexible work pieces of irregular shape, work supporting means, and mechanism for automatically turning the work thereon about a shiftable center progressively to present the margin of the work to the tool, said mechanism comprising a presser foot arranged frictionally to engage and progressively smooth the margin adjacent to the operative portion of the tool, a steering wheel reversibly rotatable at variable speeds for frictionally engaging the work inwardly of its margin, and control means for said steering wheel including a servo motor coupled to the steering wheel and a sensor in the vicinity of said presser foot responsive to the marginal curvature of the work, said sensor being electrically connected through an amplifier circuit to said servo motor whereby the steering wheel is effective to shift the center about which the work is turned along a line extending substantially through the work engaging area of the presser foot.

12. A machine as set forth in claim 11 and further characterized in that said sensor is of an edge follower displacement type, and the work engaging area of said presser foot is provided with a trailing straight edge arranged to extend between the operative portions of the sensor and of the tool.

13. A machine as set forth in claim 11 and further characterized in that there is provided a unidirectional feed wheel mounted in said presser foot to urge the work toward the tool, power means for operating said feed wheel at substantially constant preselected speed, and mechanism including a universal joint for coupling the feed wheel to said power means.

14. A machine as set forth in claim 11 and further characterized in that said work supporting means includes a roll for coacting on the work with the presser foot, the work engaging surface of said roll being at least in part of elastic material to facilitate traction.

15. In a machine having a tool for operating upon sheet material, work supporting means, a pair of spaced, independently controlled sheet engaging members cooperative therewith for feeding and steering the material to shift the path of operation of the tool thereon, and mechanism responsive to predetermined curvature for causing said members to apply reversible steering couples to the material, the turning centers of said couples being shiftable along a line extending through the points of engagement of the members with the material.

16. In a machine having a tool for operating on flexible work pieces and automatic mechanism for steering the work with respect to the tool, said mechanism including a variable speed, independently driven steering member spaced from the operating zone of the tool and a constantly driven member adjacent to said zone, a presser foot frictionally engageable with the work to smooth it out as it approaches the tool operating zone, said presser foot providing a bearing for the constantly driven member, manual means for causing the presser foot and said constantly driven member to release the work, and electrical means responsive to operation of said manual means for causing said steering member to feed the work away from said zone.

17. Automatic mechanism for feeding and steering sheet material with respect to an operating tool comprising work supporting means, a fixed guide ahead of the tool disposed to be engaged by the work, a presser foot frictionally engageable with the work on the supporting means in the vicinity of the fixed guide, a variably driven, reversible steering member spaced from the presser foot and cooperative with the work supporting means and the presser foot for exerting steering couples on the work, and curvature sensing means for controlling said steering member according to selected variable curvature.

18. Mechanisms as set forth in claim 17 and further characterized in that said presser foot rotatably supports a toothed feed wheel arranged to urge the work toward the tool, and means is provided for adjustably spacing the presser foot and said wheel relatively to said supporting means whereby the traction of the presser foot and the effective bite of the feed wheel on the work may be modified.

19. In a machine having a tool for operating on a flat work piece, work supporting means, means including a servo-motor driven steering member arranged frictionally to engage the work and guide it in cooperation with said means relatively to the tool, curvature sensing means including a variable linear differential transformer for controlling the steering member, the transformer having a core normally displaceable from a substantially neutral position according to the curvature being sensed to signal for changes in speed and/or direction of steering by the member, means for caging the core when the transformer is energized and the machine is inoperative, and means responsive to initial presentation of the work into operative relation to the member for rendering said caging means inoperative.

20. A machine as set forth in claim 19 wherein the core of said transformer, when caged, is biased from a neutral position with respect to its secondary coils to signal for movement of the steering member in a direction tending to feed the work toward the tool, and means operable upon presentation of the work in operative relation to the member but out of operative relation with respect to the sensing means to reverse the steering member and thereby reject the work.

21. In a machine having a tool for operating on flat, flexible work, work supporting means, work steering means cooperative with the supporting means for feeding and guiding the work with respect to the tool, said steering means including a reversibly rotatable member mounted frictionally to engage the work and relatively yieldable heightwise of the supporting means, curvature sensing means for controlling the steering means, said sensing means being responsive to variable curvature of work passing a locality ahead of the tool, and control mechanism for rendering the sensing means inoperative until the member has been moved heightwise relatively to the supporting means by the reception of work to be fed.

22. Mechanism for steering a flat work piece relatively to an operating tool comprising a work support, a pair of spaced rotary work engaging wheels, means for driving one of the wheels at fixed velocity, other means for variably and reversibly driving the other roll to steer the work in cooperation with the support, said other means including a linear variable differential transformer having a displaceable work engaging finger and a servo motor controlled thereby, and a fixed edge guide interposed between the operating locality of the tool and said finger.

23. In a machine having a tool for operating progressively on a flat work piece of irregular curvature, autoatic work feeding and guidance mechanism including edge curvature sensing means for shifting the work piece to cause the tool to operate thereon along a predetermined path, and means automatically operable at a preselected corner of the work piece for rendering the sensing means inoperative and causing said mechanism to eject the work piece by steering it away from the tool.

24. A machine as set forth in claim 23 wherein said guidance mechanism includes a work engaging steering member, a servo-motor operatively connected thereto, and a servo-amplifier for controlling the motor, and the automatic means for effecting work ejection comprises a corner counting system electrically connected to the servo-amplifier and including a source of light together with a cell responsive to light therefrom, said cell and source being positioned ahead of the edge curvature sensing means and arranged at opposite sides of the work.

25. In a machine having feeding means for predeterminedly moving a work piece relatively to a tool for operating thereon, a servo-amplifier, a servo-motor controlled thereby for operating said feeding means, curvature sensing means including a variable linear differential transformer normally connected electrically to the servo-amplifier for transmitting steering signals thereto, and a manually selective corner counting circuit and a phase shift network normally not electrically connected to the servo-amplifier, said circuit being automatically operative upon a selected number of corners having traversed the sensing means to disrupt the sending of signals from the transformer and to cause said network to signal the servo-amplifier for immediate feed-out of the work from said tool by the feeding means.

26. A machine as set forth in claim 25 and further characterized in that means is provided in said network for predeterminedly adjusting shift in the phase of the input to said servo amplifier whereby the direction of work feed-out may be manually selected.

27. In a machine for operating on curvilinear and/or angular sheet material, a work support, a power operated tool mounted adjacent thereto, a work sensing device ahead of the tool and actuatable by an edge of the material as it is fed in translation to said tool upon each relative angular transverse movement of predetermined extent, a member frictionally engageable with the material, and a counting circuit responsive to actuation of the sensing device a selected number of times for effecting automatic ejection of the material from the tool by said member.

28. In combination with servo controlled steering mechanism for moving work in translation and at variable angles with respect to a power tool, a work support, and means automatically responsive to selected cumulative angular movements of the work in the course of operation of the tool for ejecting the work from the tool.

29. In a machine for operating on sheet material having a periphery of curvilinear and/or angular shape, a work support, an operating tool adjacent thereto, a photovoltaic cell positioned on the opposite side of sheet material on the work support from a source of light, said cell being arranged to be actuated by covering and uncovering movement of the sheet material relatively to the cell as the material is fed to the tool, and means including a corner counting circuit responsive to operation of the cell a selected number of times for ejecting the material from the machine.

30. In a machine for operating on sheet material having a periphery of curvilinear and/or angular shape, a work support, an operating tool adjacent thereto, steering means including a member frictionally engageable with the sheet material to move it in translation in variable directions relatively to the tool, a photo-voltaic cell and a light source spaced from the tool and arranged on opposite sides of the path of the sheet material, and a corner counting circuit automatically responsive to covering and uncovering of the cell by the material a selected number of times for causing said member to steer the sheet material in predetermined direction away from the tool.

31. In a machine having a tool for operating on a flat work piece, a work support, means including a servo-motor and a linear variable differential transformer normally controlling the latter for steering the work as it is fed relatively to the tool, said transformer having a relatively movable core and primary and secondary coils, curvature sensing means normally operative to effect relative displacement of said core and coils from a substantially neutral signaling position, means for energizing the transformer and the servo-motor, control means responsive to operation of said energizing means for rendering the sensing means inoperative, and other means responsive to initial presentation of the work to the machine for automatically restoring the sensing means to normally operative condition.

32. In a machine having a tool for operating on the irregular margins of work pieces, a work support, an edge guide arranged to be engaged by the work on the support, work steering means including a servo-motor, a servo-amplifier connected thereto, and curvature sensing means normally controlling the latter for steering the work to move its margin progressively in contact with the guide and toward the tool, and a circuit responsive to the passing of a predetermined portion of the margin with respect to the guide for overriding the control of said curvature sensing means, said circuit being connected to the servo-amplifier and automatically energizable to command the servo-motor to steer the work away from the tool.

33. A machine as set forth in claim 32 wherein the overriding circuit comprises a corner counting system and a phase shift network, the latter being energizable upon operation of said system at passage of a predetermined number of corners of the work to signal the servo-amplifier for feed-out of the work, and means responsive to such feed-out for resetting the corner counting system.

34. A machine as set forth in claim 32 wherein said corner counting system includes adjustable means for delaying the effective operation of said system until an initial portion of the work has been presented for engagement with said edge guide.

35. In a machine for shaping the margin of work pieces, a work support, an operating tool to which work on said support is to be guided, power means engageable with the work and operable at variable speeds to steer it in translation and angularly with respect to the tool, curvature sensing mechanism for controlling said means, said means including a member reversibly operative in accordance with displacement from a substantially neutral position of one portion of said mechanism relatively to another portion thereof, and means for delaying effectiveness of the steering means upon presentation of the work to the machine until said member is in operative relation to the work and curvature of the latter is being sensed by the mechanism.

36. In a machine for operating on the margins of work pieces, a work support, a power tool to which work on said support is to be guided, an edge guide mounted adjacent to the operating zone of the tool, a servo-motor, automatic work steering means operatively connected to the servo-motor and including a work engaging member, a servo-amplifier for controlling the servo-motor, curvature sensing means responsive to varying curvature of the work as it passes a locality ahead of the edge guide for signaling for changes in velocity of said member via said servo-amplifier, a counting circuit including a manual selector switch, a stepping switch, and an adjustably mounted, light-actuated element positioned approximate to said locality for controlling the stepping switch, said circuit being operatively connected to the servo-amplifier upon predetermined actuation of said element according to the setting of the selector switch, a phase shift network normally disconnected from the servo-amplifier, and means controlled by the predetermined actuation of said element for rendering the sensing means inoperative and simultaneously connecting the network to the servo-amplifier to cause the member to assume a substantially unchanging velocity.

References Cited in the file of this patent

UNITED STATES PATENTS

| | | |
|---|---|---|
| 1,944,311 | Woodcock et al. | Jan. 23, 1934 |
| 2,259,502 | Topham et al. | Oct. 21, 1941 |